(12) United States Patent
Oda et al.

(10) Patent No.: US 10,248,101 B2
(45) Date of Patent: Apr. 2, 2019

(54) TOOL PATH GENERATION METHOD AND MACHINE TOOL USING RATE OF CHANGE OF CURVATURE BASED SMOOTHING

(71) Applicant: MAKINO MILLING MACHINE CO., LTD., Tokyo (JP)

(72) Inventors: Mitsunari Oda, Aiko-gun (JP); Megumi Furuta, Aiko-gun (JP); Akihiro Shinone, Aiko-gun (JP); Toshimune Kawai, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/517,455

(22) PCT Filed: Oct. 29, 2014

(86) PCT No.: PCT/JP2014/078782
§ 371 (c)(1),
(2) Date: Apr. 6, 2017

(87) PCT Pub. No.: WO2016/067392
PCT Pub. Date: May 6, 2016

(65) Prior Publication Data
US 2017/0300029 A1 Oct. 19, 2017

(51) Int. Cl.
*G05B 19/19* (2006.01)
*G05B 19/4093* (2006.01)
*G05B 19/4103* (2006.01)

(52) U.S. Cl.
CPC ......... *G05B 19/19* (2013.01); *G05B 19/4093* (2013.01); *G05B 19/4103* (2013.01);
(Continued)

(58) Field of Classification Search
None
See application file for complete search history.

(56) References Cited

U.S. PATENT DOCUMENTS 3,969,615 A * 7/1976 Bowers .............. G05B 19/4103
318/573
6,591,158 B1 * 7/2003 Bieterman ............ G05B 19/41
700/169
(Continued)

FOREIGN PATENT DOCUMENTS

CN 101281401 10/2008
CN 103645677 3/2014
(Continued)

OTHER PUBLICATIONS

International Search Report dated Jan. 27, 2015, directed towards PCT Application No. PCT/JP2014/078782; 1 page.

*Primary Examiner* — Bernard G Lindsay
(74) *Attorney, Agent, or Firm* — Morrison & Foerster LLP

(57) ABSTRACT

A tool path generation method for generating a second tool path by performing a smoothing process on a first tool path for processing a work with a machine tool includes a change rate calculation step of calculating a curvature change rate of the first tool path at a plurality of moving points ($P_n$) of the first tool path. The tool path generation method includes: a weight calculation step of calculating a moving average weight on the basis of the curvature change rate of the first tool path at each of the moving points ($P_n$); and a step of calculating coordinate values of the moving average of the moving points ($P_n$) using the weight at each of the moving points ($P_n$), and setting the coordinate values of the moving average of the moving points ($P_n$) as moving points of the second tool path.

5 Claims, 12 Drawing Sheets

(52) U.S. Cl.
CPC .............. *G05B 2219/35097* (2013.01); *G05B 2219/36221* (2013.01); *G05B 2219/45202* (2013.01)

(56) References Cited

U.S. PATENT DOCUMENTS

| | | | |
|---|---|---|---|
| 2008/0249653 A1 | 10/2008 | Ichikawa | |
| 2012/0215334 A1* | 8/2012 | Tanuma | G05B 19/4103 700/97 |
| 2013/0173026 A1* | 7/2013 | Kawana | G05B 19/416 700/30 |
| 2013/0204426 A1* | 8/2013 | Tanuma | G05B 19/182 700/190 |
| 2013/0211578 A1* | 8/2013 | Tanuma | G05B 19/402 700/192 |
| 2014/0195037 A1* | 7/2014 | Nishibashi | G05B 19/4103 700/188 |
| 2015/0293519 A1* | 10/2015 | Maeda | B23C 3/00 700/186 |

FOREIGN PATENT DOCUMENTS

| | | |
|---|---|---|
| CN | 103744349 | 4/2014 |
| CN | 103809510 | 5/2014 |
| JP | 64-36308 | 2/1989 |
| JP | 3958112 | 11/2003 |
| JP | 2007-257094 | 10/2007 |
| WO | WO-2012/056554 | 5/2012 |
| WO | WO-2012/056588 | 5/2012 |

* cited by examiner

---> : PATH BEFORE SMOOTHING
——> : PATH AFTER SMOOTHING
[ ] : SHAPE BEFORE SMOOTHING
[ ] : SHAPE AFTER SMOOTHING

----- : FIRST TOOL PATH
——— : SECOND TOOL PATH

- - ▷ : FIRST TOOL PATH
——▷ : SECOND TOOL PATH OF FIRST EXAMPLE

- - ▷ : FIRST TOOL PATH
——▷ : SECOND TOOL PATH OF SECOND EXAMPLE

TOOL PATH GENERATION METHOD AND MACHINE TOOL USING RATE OF CHANGE OF CURVATURE BASED SMOOTHING

CROSS-REFERENCE TO RELATED APPLICATIONS

This application is a U.S. National Stage patent application of International Patent Application No. PCT/JP2014/078782, filed Oct. 29, 2014, which is hereby incorporated by reference in the present disclosure in its entirety.

FIELD OF THE INVENTION

The present invention relates to a tool path generation method and a machine tool.

BACKGROUND OF THE INVENTION

In a related art, machine tools are known which perform machining such as cutting by moving a tool relative to a workpiece. Among such machine tools, numerically controlled machine tools are known which are configured to set a tool path based on coordinates or the like of a predetermined feed axis and perform machining while moving the tool relative to the workpieces. Such machine tools are capable of performing machining automatically while changing relative position of the tool with respect to the workpiece by moving at least one of the workpiece and the tool in accordance with a command from a control device.

The machine tools form workpieces having target shape by performing machining on workpieces having a predetermined shape. A machining program for operating the machine tools can be generated automatically based on target shapes of designed workpieces by a CAM (Computer Aided Manufacturing) apparatus. The CAM apparatus generates a tool path including information on relative movement of the tool with respect to the workpiece based on the target shape of the workpieces. Subsequently, the machining program including the information on the tool path is outputted.

The machine tool sets movement points at predetermined intervals based on the machining program, and controls the tool so as to pass through the movement points. For example, when the workpiece stops and the tool moves, the tool moves in such a manner that a tool tip point passes through the movement points. The tool path includes the movement points, and the tool moves linearly between the movement points.

When a surface of the workpieces having the target shape is a curved surface, the tool path follows the surfaces of the workpieces. However, since the tool moves linearly between the movement points, machined surfaces may not become smooth curved surfaces and pointed portions formed by combining flat plains may be formed on portions of the workpieces which are to be curved surfaces. Accordingly, in a technique of the related art, smoothing treatment is known which corrects a tool path in order to achieve workpieces having smooth machined surfaces. Smoothing treatment is known to correct positions of the movement points on the tool path so as to generate a new tool path.

International Publication No. 2012/056554 discloses a tool path generation method including a procedure of calculating bent angles at bent points of a bent line that is formed by connecting machining points in line in sequence and a procedure of deriving an approximate curve that generates an approximate curve that gets closer to the bent point as the bent angle increases. In the tool path generation method, generation of the tool path along the approximate curve is disclosed.

Japanese Patent No. 3958112 discloses in the specification a velocity control method by using a numerical control device, which smooths command data having a curved shape approximated by segments and corrects the command point by a unit smaller than set unit with a predetermined tolerance. It is disclosed that in this velocity control method, a velocity control is performed by using the corrected command point and computing a velocity in which accelerations of respective movement components are specified values or less.

CITATION LIST

Patent Literature 1: International Publication No. 2012/056554
Patent Literature 2: Japanese Patent No. 3958112

SUMMARY OF THE INVENTION

During a period of machining with a machine tool, a force is applied to a workpiece or a tool at portions where a direction of travel of a tool path changes. In other words, an acceleration of a moving part of the workpiece or the tool varies. When the direction of the travel changes abruptly, a large force is applied to the moving part, and shaking or vibration may occur. Consequently, machining accuracy of the workpiece may be lowered. For example, when a curved surface portion is machined, a force applied to a feed axis varies, resulting in an increase in surface roughness. When the direction of the relative movement of the tool with respect to the workpiece changes, the relative velocity of the tool with respect to the workpiece can be reduced for machining. In the tool path on which smoothing treatment has been performed as well, the velocity of movement can be reduced for machining at portions where the tool path is curved. Reduction in the velocity of movement can suppress lowering of machining accuracy. However, a problem of increase in time for machining workpieces arises.

Although the surface after machining may be smoothed by performing smoothing treatment, it is known that a tool path is deviated from the original tool path. The tool path on which smoothing treatment has been performed extends more inside than the tool path on which the smoothing treatment is not performed. According to a velocity control method described in the above-described Japanese Patent No. 3958112, the tool path on which smoothing treatment has been performed can be approximated to the tool path on which smoothing treatment is not performed. However, the velocity of movement at portions where the tool path curves is not considered, and thus portions where the tool path curves significantly needs to be machined at a reduced velocity of movement.

It is an object of the present invention to reduce machining time in a tool path generation method for smoothing treatment and a machine tool.

A tool path generation method of the present invention is a tool path generation method for performing smoothing treatment on first tool path used in a machine tool for machining workpieces so as to generate second tool path, the tool path generation method including a step of setting movement points on the first tool path, and a rate-of-change calculation step for calculating rates of change in curvature of the first tool path at the respective movement points. The tool path generation method includes a weight calculation step for calculating a weight of moving average based on the rate of change in curvature of the first tool path at each of the movement points, and a step of calculating a coordinate value of the moving average of the movement point by using the weight at each of the movement points and setting the coordinate value of the moving average of the movement point as a movement point of the second tool path.

In the invention described above, the rate-of-change calculation step can include a step of calculating a moving average value in curvature at each of the movement points of the first tool path and a step of calculating a rate of change in curvature based on the calculated moving average value in the curvature.

In the invention described above, the weight calculation step can include a step of calculating a standard deviation of a normal distribution based on a rate of change in curvature, and a step of calculating the weight of moving average based on the normal distribution having the calculated standard deviation.

In the invention described above, an allowable value for a dimensional error of the machined workpieces can be predetermined, and the weight calculation step can include a step of setting the number of movement points to be used for calculating the moving average based on the allowable value.

The machine tool of the present invention includes a control device that generates second tool path by performing smoothing treatment on first tool path set based on a first machining program. The control device includes a movement point setting part that sets a plurality of movement points based on the first tool path and a rate-of-change calculation part that calculates a rate of change in curvature of the first tool path at each of the movement points. The control device includes a weight setting part that calculates a weight of moving average based on the rate of change in curvature of the first tool path at each of the movement points, and a movement point correction part that calculates a coordinate value of the moving average of the movement point by using the weight at each of the movement points and sets the coordinate value of the moving average of the movement point as a movement point of the second tool path. Furthermore, the control device includes a program generation part that generates a second machining program based on the movement point of the second tool path.

According to the present invention, machining time can be reduced in a tool path generation method for performing smoothing treatment and a machine tool.

DETAILED DESCRIPTION OF THE INVENTION

Referring now to FIG. 1 to FIG. 19, a tool path generation method and a machine tool according to an embodiment will be described. The tool path of the present invention indicates a relative path of the tool with respect to the workpiece when the tool machines the workpiece while moving relative to the workpiece.

The machine tool of the present embodiment is a numerically controlled machine tool that performs machining by automatically moving the tool relative to the workpiece in accordance with a machining program. The machining program is input to the machine tool. The machine tool performs machining by moving at least one of the workpiece and the tool in accordance with the machining program.

The machine tool of the present embodiment includes three linear feed axes, i.e., X-axis, Y-axis and Z-axis, and causes the tool and the workpiece to move relatively in directions of the respective feed axes, so that machining of workpieces having a three-dimensional shape can be achieved. In the present embodiment, a case where the tool moves in directions of two axes, i.e., the X-axis and the Y-axis, for machining is described by way of example for simplifying the description. However, the present invention includes a case where the tool and the workpiece are moved relatively in directions of three axes, i.e., the X-axis, the Y-axis, and the Z-axis for machining.

Figure 1:
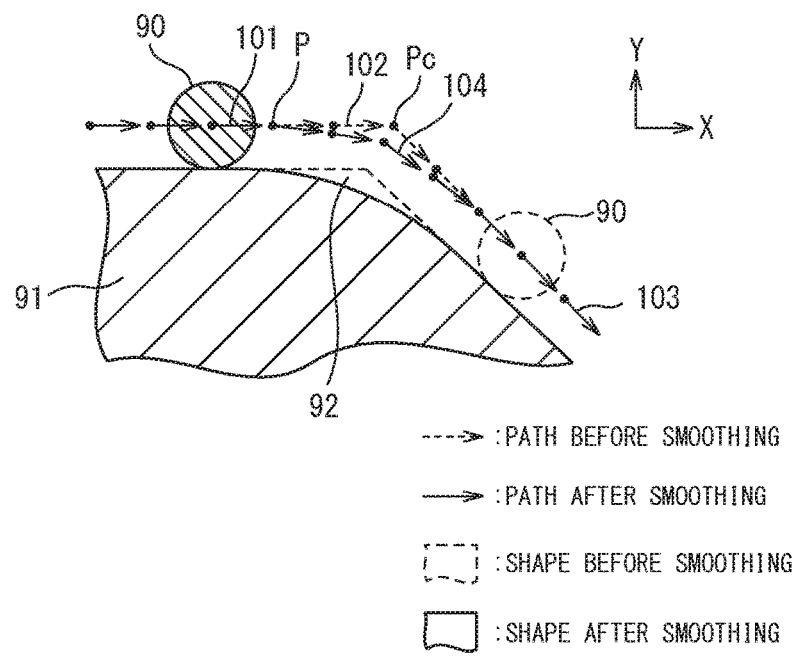
FIG. 1 is a schematic cross-sectional view of a workpiece and a tool when cutting the workpiece.

FIG. 1 is a schematic cross-sectional view of a workpiece and a tool when the tool moves relative to the workpiece. A tool 90 cuts and machines a workpiece 91 while moving along a surface of the workpiece 91. The surface of the workpiece 91 including a curved part 92 is machined at a side surface of the tool 90. When the workpiece 91 is machined, a plurality of the movement points P are set in accordance with the machining program. A path connecting the movement points P corresponds to the tool path. The tool 90 is moved such that a reference point of the tool 90 such as a tool tip point passes the movement points P.

According to the tool path generation method of the present embodiment, second tool path is generated by performing smoothing treatment on first tool path defined by the first machining program. The tool path on which smoothing treatment is not performed is indicated by arrows 101, 102, and 103. When the curved part 92 is machined, a direction of movement of the tool 90 is significantly changed at a movement point Pc. Therefore, at a portion of the workpiece corresponding to the movement point Pc, the surface is formed into a pointed shape instead of being formed to a smooth curve. Therefore, smoothing treatment for smoothing the tool path by correcting positions of the movement points is performed.

The second tool path on which smoothing treatment has been performed is indicated by arrows 101, 104, and 103. By machining along the second tool path, the surface of the workpiece 91 is formed to be smoother at the curved part 92 than the case of machining along the first tool path.

First, the tool path generation methods of reference examples will be described. Here, first reference example and second reference example will be described. In the tool path generation method, control for correcting positions of the movement points which are set once is performed. In the smoothing treatment, a coordinate value of the moving average of the preset movement points is calculated. Subsequently, the coordinate value of the moving average is set to the movement points after correction. A path passing through the movement points after correction corresponds to the second tool path.

Figure 2:
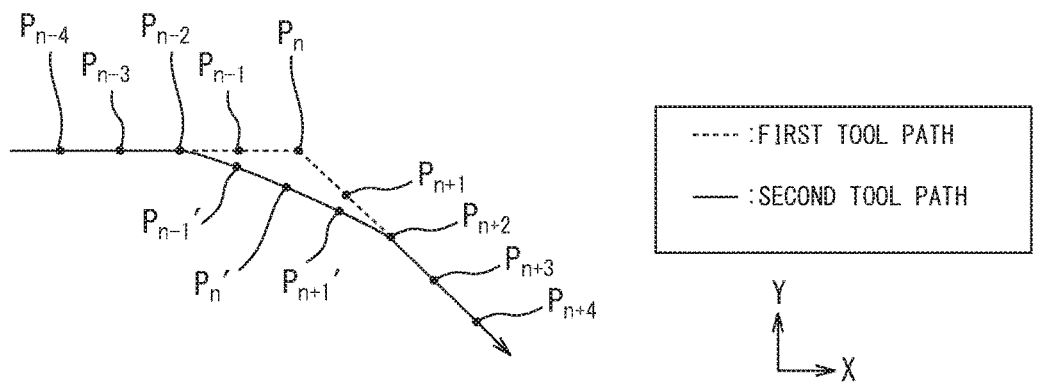
FIG. 2 is an explanatory drawing illustrating a tool path generated by a tool path generation method according to first reference example.

FIG. 2 illustrates an explanatory drawing of the tool path generation method according to the first reference example. The movement points are set on the first tool path specified by the first machining program. In the example illustrated in FIG. 2, a movement point from $P_{n-4}$ to a movement point $P_{n+4}$ are described. In the first tool path, an angled part appears at a portion of the workpiece which corresponds to the movement point $P_n$ so as to form a pointed shape.

In the tool path generation method of the first reference example, coordinates are detected at the respective movement points, and the coordinate value of the moving average is calculated. The coordinate value of the moving average of the movement points $P_n$ is expressed by equation (1) and equation (2), where the coordinate value of the movement points $P_n$ is expressed as $(x_n, y_n)$.

[Formula 1]

$$x'_n = \frac{x_{n-2} + x_{n-1} + x_n + x_{n+1} + x_{n+2}}{5} \quad (1)$$

$$y'_n = \frac{y_{n-2} + y_{n-1} + y_n + y_{n+1} + y_{n+2}}{5} \quad (2)$$

$x_n$: x coordinate value before correction
$y_n$: y coordinate value before correction
$x_n'$: x coordinate value after correction
$y_n'$: y coordinate value after correction In calculation of the moving average, an average of coordinate values of preset number of movement points preceding and following a target movement point is calculated for an X-coordinate and a Y-coordinate. In this example, an average of preceding two points and following two points of the movement point $P_n$, i.e., total 5 points is calculated. The number of movement points to be selected when the average is calculated is referred to as an order. Any numbers can be employed as the order. In this example, five order moving average is calculated. A point of a coordinate $(X_n', Y_n')$ calculated by the moving average is set to a movement point $P_n'$ after correction. By performing the same calculation as described above respectively to the movement point $P_{n-4}$ to the movement point movement points from a movement point $P_{n-4}'$ to a movement point $P_{n+4}'$ on which the smoothing treatment is performed can be set. The second tool path can be generated on the basis of the path that connects the movement points on which the smoothing treatment is already performed.

When the movement point $P_{n-2}$ is corrected, two movement points preceding and following the movement point $P_{n-2}$ are linearly aligned. Therefore, the position of the movement point $P_{n-2}'$ after correction is the same as the position of the movement point $P_{n-2}$ before correction. In other words, the movement point $P_{n-2}$ is immobile. The movement points such as the movement point $P_{n+2}$ are also immobile. However, at the movement point $P_n$, the five movement points including the preceding and following movement points are not aligned linearly, and the coordinate value of the movement point $P_n'$ after correction is affected by the coordinate values of the preceding and following movement points $P_{n-2}$, $P_{n-1}$, $P_{n+1}$, and $P_{n+2}$.

In this example, the movement points $P_{n-1}$, $P_n$, and $P_{n+1}$ in the vicinity of a top of the bent part are affected by the coordinate of the preceding and following movement points. The movement points $P_{n-1}'$, $P_n'$, and $P_{n+1}'$ after correction come inside the movement points $P_{n-1}$, $P_n$ and $P_{n+1}$ before correction. In this manner, the second tool path comes inside the first tool path. A so-called inboard turning phenomenon occurs on the second tool path on which the smoothing treatment is already performed.

Figure 3:
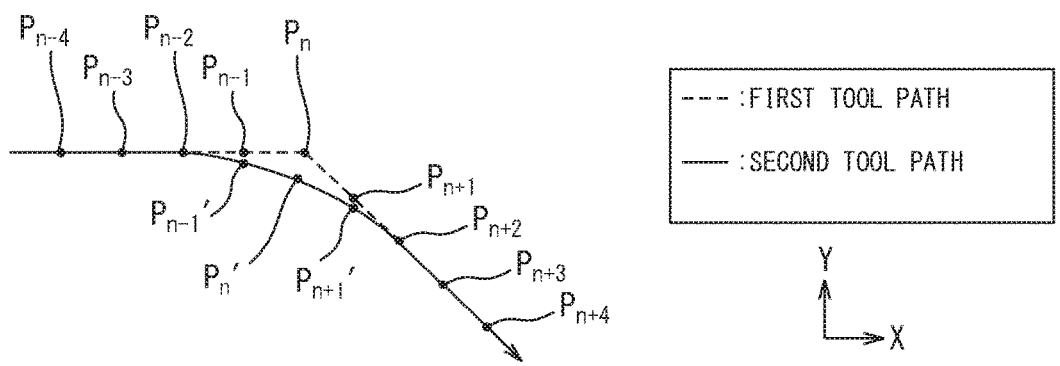
FIG. 3 is an explanatory drawing illustrating a tool path generated by a tool path generation method according to second reference example.

FIG. 3 illustrates an explanatory drawing of the tool path generation method according to the second reference example. In the second reference example, in order to reduce the inboard turning phenomenon of the tool path, the moving average is calculated by adding a weight to the respective coordinate values. In other words, weight mean values are calculated as the coordinate values after correction. The coordinates $(X_n', Y_n')$ of each of the movement points after correction considering the weight are calculated by equation (3) and equation (4) given below.

[Formula 2]

$$x'_n = \frac{w_{n-2}x_{n-2} + w_{n-1}x_{n-1} + w_n x_n + w_{n+1}x_{n+1} + w_{n+2}x_{n+2}}{w_{n-2} + w_{n-1} + w_n + w_{n+1} + w_{n+2}} \quad (3)$$

$$y'_n = \frac{w_{n-2}y_{n-2} + w_{n-1}y_{n-1} + w_n y_n + w_{n+1}y_{n+1} + w_{n+2}y_{n+2}}{w_{n-2} + w_{n-1} + w_n + w_{n+1} + w_{n+2}} \quad (4)$$

$w_n$: weight

Weights by which an X-coordinate value and a Y-coordinate value of each of the movement points are multiplied can be set to be larger for the coordinate value of the movement point to be corrected and set to be small for the coordinate value as away from the movement point to be corrected.

Figure 4:
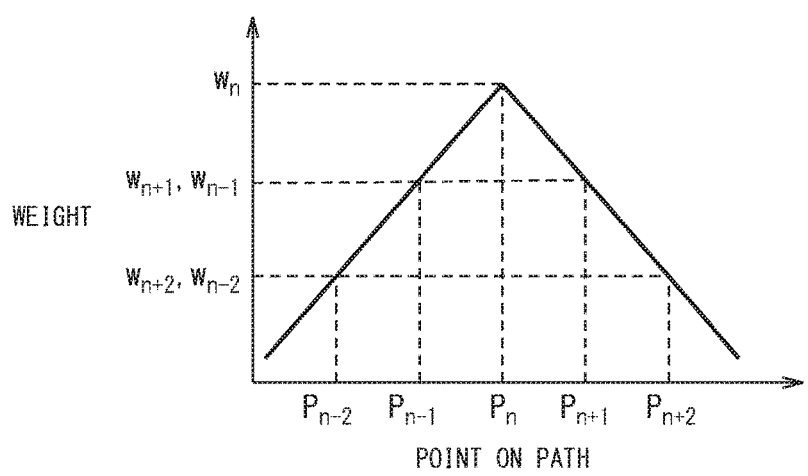
FIG. 4 is a graph of a weight used for calculating a coordinate value of the moving average when the tool path of the second reference example is generated.

FIG. 4 illustrates a graph of the weights by which the respective coordinate values are multiplied. A lateral axis indicates the movement points on the tool path. The weight of the coordinate value of the movement point $P_n$ to be corrected is set to be the highest, and is set to decrease linearly as away from the movement point $P_n$. In the second reference example, when the movement points $P_{n-4}$ to $P_{n+4}$ are corrected, the weights illustrated in FIG. 4 are applied to all of the movement points $P_{n-4}$ to $P_{n+4}$. In other words, the same weighting pattern is employed for correction of the coordinate values of all of the movement points.

Referring to FIG. 2 and FIG. 3, when the moving average is calculated by multiplying the coordinate values of the respective movement points by the weight, the inboard turning phenomenon can be reduced compared with a case where the moving average is calculated without multiplying the coordinate value by the weight. In the second reference example, the inboard turning phenomenon of the movement points after correction can be further reduced than that in the first reference example. The influence of the coordinate value to be corrected is increased, so that the movement points after correction can be approximated to the movement points before correction.

In this manner, the moving average value using the weight can be calculated for the movement points so as to set the moving average of the coordinate values as the coordinate values after correction. The equations for calculating the coordinate values after correction may be generalized as equation (5) and equation (6) given below. Variable i is an order and may be set in advance.

[Formula 3]

$$x'_n = \frac{\Sigma w_i x_i}{\Sigma w_i} \qquad (5)$$

$$y'_n = \frac{\Sigma w_i x_i}{\Sigma w_i} \qquad (6)$$

i: order

When machining is performed without reducing the relative velocity of movement of the tool with respect to the workpiece in portions where the direction of travel of the tool with respect to the workpiece changes, shaking or impact may be generated in the feed axes. Consequently, surface roughness may increase, or dimensional accuracy may be lowered. In other words, machining accuracy is lowered. Accordingly, control for reducing the velocity of movement can be performed in the portions where the direction of travel of the tool with respect to the workpiece changes.

Referring to FIG. 1, for example, when the surface of the workpiece 91 is machined into a flat shape as indicated by the arrow 101, the velocity of movement of the tool 90 can be set to a constant velocity for machining. However, when a curved surface portion of the workpiece 91 is machined as indicated by the arrow 104, the tool is moved by reducing the velocity. When the flat portion is machined as indicated by the arrow 103 again, the velocity can be restored to the original velocity. However, reducing the velocity of movement results in increase in machining time. The velocity of movement and acceleration of the tool when the tool moves on the tool path will be discussed in detail.

Figure 5:
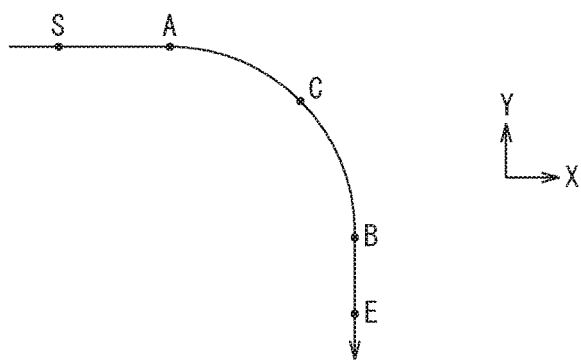
FIG. 5 is a schematic drawing for explaining an example of the tool path.

FIG. 5 illustrates an example of the tool path. In this example, the tool path in a section from a point A to a point B is curved and the tool paths in a portion preceding the point A and a portion following the point B are linear. For example, in a section from a point S to the point A, the tools move linearly. In contrast, the tool moves in a curved manner in the section from the point A to the point B.

Figure 6:
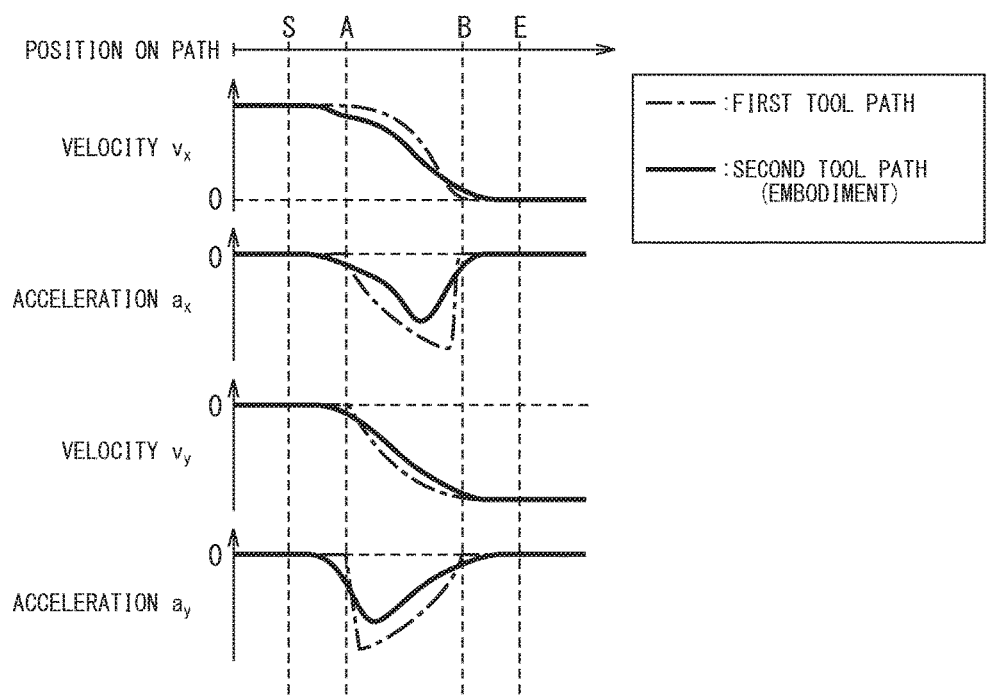
FIG. 6 is a drawing for explaining velocity and acceleration at predetermined positions on the tool path.

FIG. 6 is a graph relating to velocity and acceleration in the feeding axis. FIG. 6 illustrates the velocity and the acceleration in the feed axis when moving on the tool path illustrated in FIG. 5. The velocity and the acceleration are indicated for an X-axis direction and a Y-axis direction, respectively. On the first tool path on which the smoothing treatment is not performed yet, the velocity $v_x$ in the X-axis direction starts to decrease at the point A, and the velocity $v_x$ becomes zero at the point B. As regards acceleration $a_x$ in the X-axis direction, acceleration is generated at the point A, and an absolute value of the acceleration gradually increases. The acceleration drops abruptly to zero in the vicinity of the point B. In the vicinity of the point B, a significant change in acceleration occurs.

As regards velocity $v_y$ in the Y-axis direction, zero to a negative velocity $v_y$ is generated at the point A. Subsequently, the absolute value of the velocity $v_y$ gradually increases. At the point B, the velocity reaches to a constant velocity $v_y$. Therefore, as regards acceleration $a_y$ in the Y-axis direction, a significant change in acceleration appears in the vicinity of the point A.

It is considered that the feed axis is shaken or receives an impact during a machining period because change in acceleration is significant. The cause of occurrence of the change in acceleration was found to be in a rate of change in curvature of the tool path. In other words, when the rate of change in curvature increases, the tool changes the direction of travel abruptly. In such a case, it was found that a significant change in acceleration appeared. Accordingly, in the tool path generation method of the present invention, a tool path that reduces the change in acceleration is generated in a portion where a significant change in acceleration appears.

Referring to FIG. 5 and FIG. 6, for example, an acceleration is zero in the section from the point S to the point A because the tool path has no change in curvature. In a section from the point B to a point E, the acceleration is zero. In contrast, significant changes in curvature appear at the point A and the point B, and significant changes in acceleration appear in these portions. According to the present invention, control for changing the weight by which the coordinates of the respective movement points are multiplied is performed depending on the rate of change in curvature of the tool path.

Figure 7:
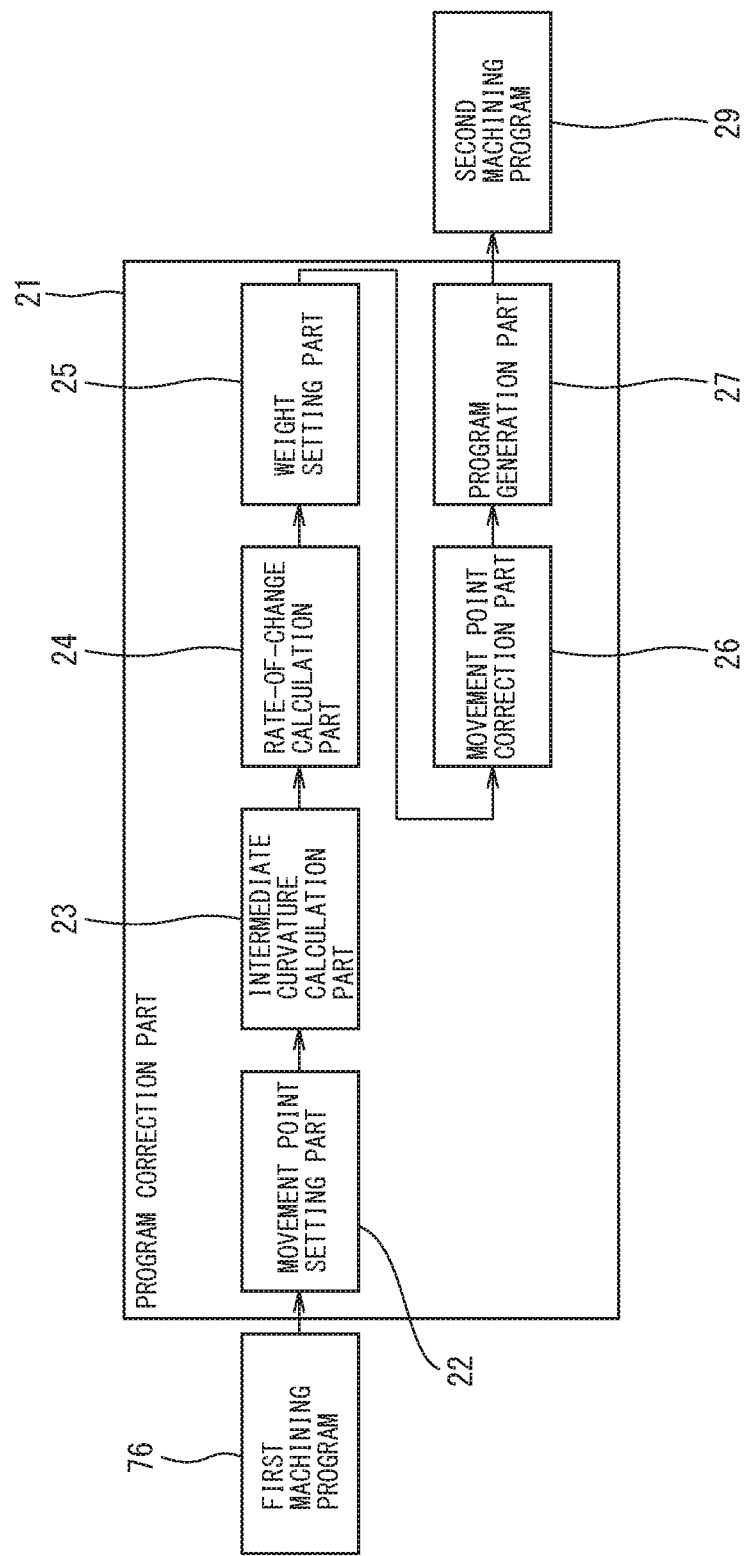
FIG. 7 is a block diagram illustrating a program correction apparatus according to an embodiment.

FIG. 7 illustrates a block diagram illustrating a program correction apparatus according to the present embodiment. A program correction apparatus 21 includes, for example, a CPU (Central Processing Unit), a RAM (Random Access Memory), a ROM (Read Only Memory), and the like connected to each other via buses.

The program correction apparatus 21 receives an input of the first machining program 76 generated by a CAM unit or the like in advance. The first machining program 76 includes information on the first tool path. The program correction apparatus 21 generates the second tool path by correcting the movement points of the first tool path and a second machining program 29 after correction is output based on the second tool path.

The program correction apparatus 21 includes a movement point setting part 22 that sets movement points based on the first machining program 76, and an intermediate curvature calculation part 23 that calculates curvatures at the respective movement points and further calculates intermediate curvatures that are corrected in curvature. The program correction apparatus 21 includes a rate-of-change calculation part 24 that calculates a rate of change in intermediate curvature. The program correction apparatus 21 includes a weight setting part 25 that sets a weight for calculating the coordinate value of the moving average based on the calculated rate of change in intermediate curvature. The program correction apparatus 21 includes a movement point correction part 26 that corrects the movement points based on the set weight. The movement point correction part 26 calculates the movement points after correction. The program correction apparatus 21 includes a program generation part 27 that generates a new second machining program based on the corrected movement points.

Figure 8:
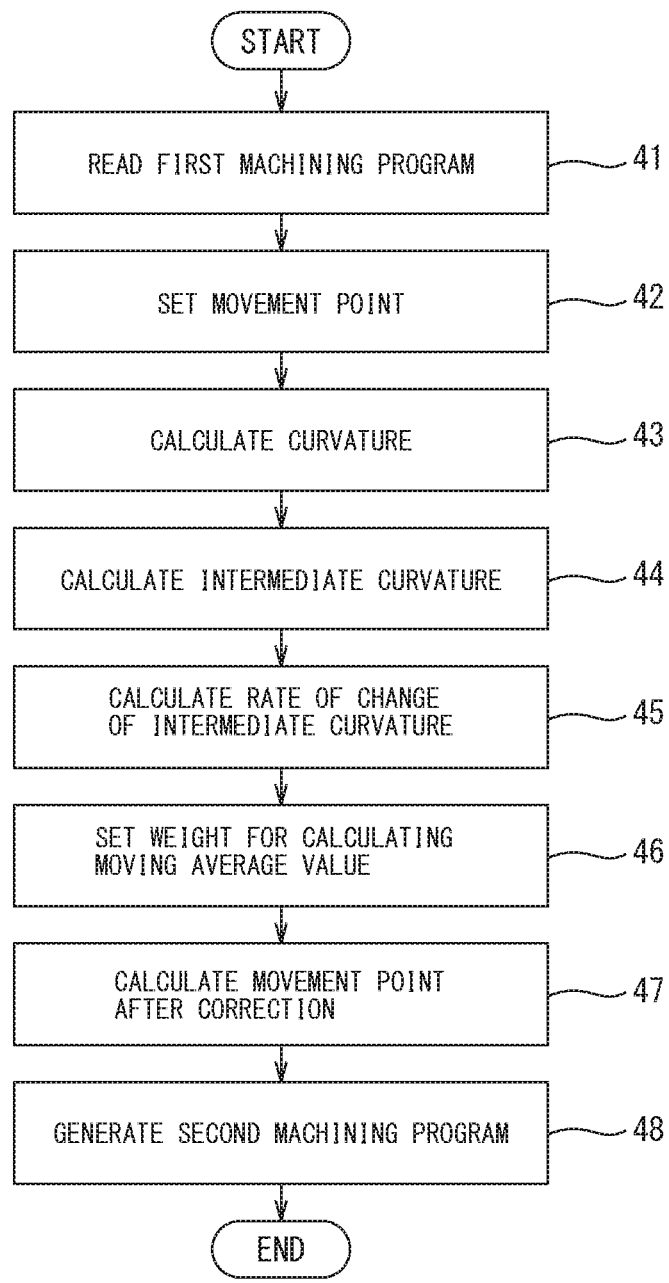
FIG. 8 is a flowchart of control for generating a second machining program from a first machining program.

FIG. 8 illustrates a flowchart of the tool path generation method according to the present embodiment. This control can be implemented by the program correction apparatus 21. Referring to FIG. 7 and FIG. 8, in Step 41, the movement point setting part 22 reads the first machining program 76 which is generated in advance. In Step 42, the movement point setting part 22 sets the movement points on the first tool path based on the first machining program 76. More specifically, the movement point setting part 22 sets the coordinate values of the movement points.

Subsequently, a control device 70 performs a rate-of-change calculation step for calculating the rates of change in curvature of the first tool path at the respective movement points. In Step 43, the intermediate curvature calculation part 23 calculates curvatures at the movement points. Calculation of the curvature is performed for each of the movement points. In the present embodiment, a radius of curvature at the movement point is calculated for calculating the curvature at the movement point.

Figure 9:
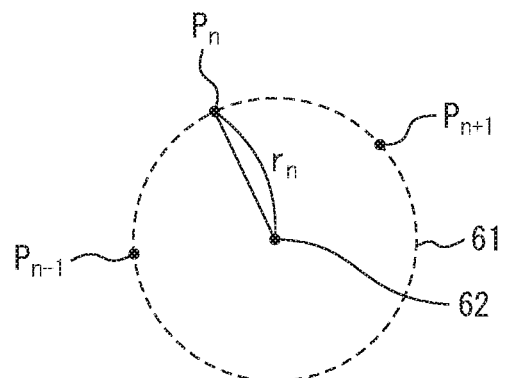
FIG. 9 is a drawing for explaining a method of calculating a radius of curvature.

FIG. 9 illustrates a drawing for explaining a method of calculating the radius of curvature. In the example, the radius of curvature at the movement point $P_n$ is calculated. The coordinate value at the movement point $P_n$ is acquired. Furthermore, the coordinate values of the movement point $P_{n-1}$ and the movement point $P_{n+1}$ preceding and following the movement point $P_n$ are acquired. An equation of a virtual circle 61 can be calculated based on the coordinate values at the movement points $P_n$, the movement points $P_{n-1}$, and the movement points $P_{n+1}$. When the coordinate values at these three points are fixed, the equation of the circle 61 is calculated. Accordingly, a radius of the virtual circle 61 can be set to the radius of curvature $r_n$.

Figure 10:
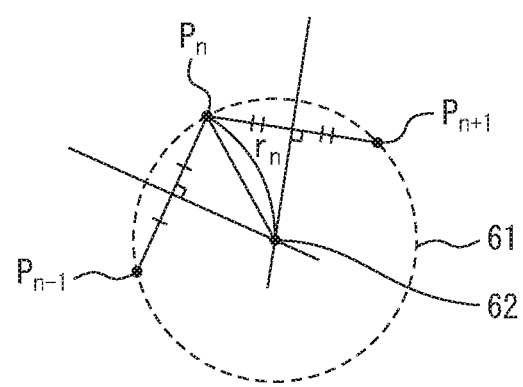
FIG. 10 is a drawing for explaining another method of calculating a radius of curvature.

FIG. 10 illustrates a drawing for explaining another method of calculating the radius of curvature. A perpendicular bisector of a segment that connects the movement point $P_{n-1}$ and the movement point $P_n$ is generated. A perpendicular bisector of a segment that connects the movement point $P_n$ and the movement point $P_{n+1}$ is generated. A point where the two perpendicular bisectors intersect can be set to a center point 62 of the virtual circle 61. When the coordinate values of the center point 62 is calculated, the radius of the virtual circle 61 can be calculated. Accordingly, the radius of the circle 61 can be set to a radius of curvature $r_n$ at the movement point $P_n$.

In a three-dimensional coordinate system, a virtual circle can be simulated based on the coordinate values of a plurality of the movement points in the same method as that described above. A radius of the virtual circle can be set to a radius of curvature of the movement point. The method of calculating the radius of curvature is not limited to the mode described above, and any method may be employed.

The curvature is an inverse of the radius of curvature. The curvature of the tool path at a prescribed movement point can be calculated based on equation (7) given below.

[Formula 4]

$$\alpha_n = 1/r_n \quad (7)$$

$\alpha_n$: curvature
$r_n$: radius of curvature

Referring now to FIG. 7 and FIG. 8, next, the intermediate curvature calculation part 23 calculates an intermediate curvature in Step 44. In the present embodiment, the rate of change in curvature of the tool path is calculated based on the corrected curvature. In the present embodiment, the corrected curvature is referred to as an intermediate curvature. The tool path illustrated in FIG. 5 is taken here as an example for describing the intermediate curvatures.

Figure 11:
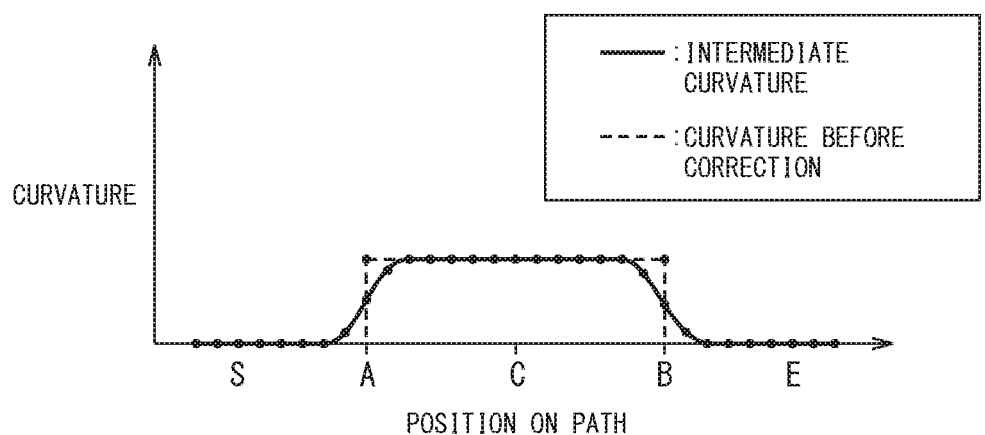
FIG. 11 is a graph for explaining an intermediate curvature.

FIG. 11 is a graph illustrating the curvature and the intermediate curvature before correction at the movement points. Referring now to FIG. 5 and FIG. 11, the curvature before correction is indicated by a broken line. With the curvature before correction, a section from the point S to the point A and a section from the point B to the point E are zero and constant. In a section from the point A to the point B, the curvature before correction is constant. However, at the point A, the curvature before correction increases abruptly. At the point B, the curvature before correction decreases abruptly.

In order to solve discontinuity at the point A and the point B as described above, in the present embodiment, correction based on the smoothing treatment is performed on curvature. In the smoothing treatment on curvature, for example, moving average value in curvature of prescribed movement points is calculated, and the calculated moving average value can be set as the intermediate curvatures. In addition, when the moving average value is calculated, the curvatures of the respective movement points can be multiplied by weights.

Figure 12:
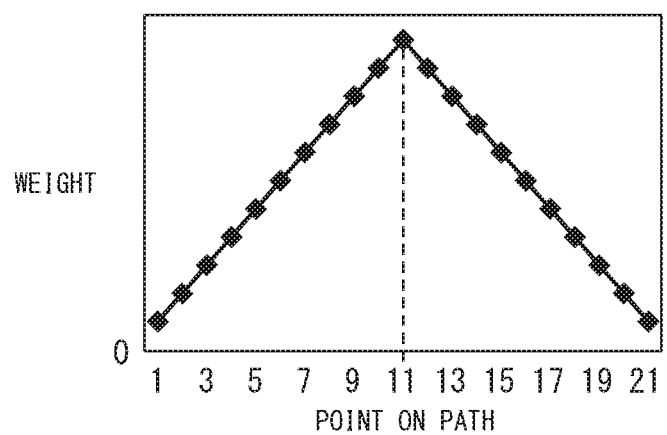
FIG. 12 is a graph of a weight used for calculating a moving average value in curvature.

FIG. 12 illustrates a graph of the weight for calculating the moving average value in curvature. In the example here, ten movement points each preceding and following the movement point to be corrected are extracted. In other words, calculation of 21 order moving average value is exemplified. The eleventh movement point corresponds to the movement point at which the moving average value is calculated this time. With this graph, the weights can be set for the respective movement points.

When the moving average value in curvature is calculated as well, the weight is set to be large at the movement point to be corrected and to decrease as it moves away from this movement point. The weight used when the smoothing treatment of the curvature is performed is not limited to this mode, and any weight may be employed. For example, weight may be set by using a normal distribution described later.

FIG. 11 illustrates the intermediate curvatures on which smoothing treatment has been performed with the moving average value in the manner described above with a solid line. The intermediate curvatures can be calculated for each movement point. The curvature starts increasing at a position slightly before the point A and becomes constant at a position slightly after the point A. The curvature starts decreasing at a position slightly before the point B and becomes zero at a position slightly after the point B. The curvature changes smoothly in the vicinity of the point A and the point B.

Figure 13:
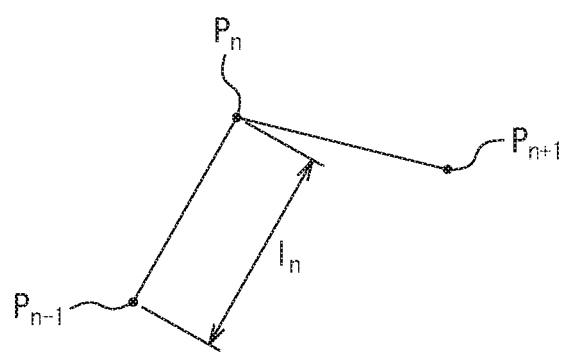
FIG. 13 is a drawing for explaining a method of calculating a rate of change in intermediate curvature.

Referring now to FIG. 7 and FIG. 8, next, the rate-of-change calculation part 24 calculates a rate of change in intermediate curvature in Step 45. FIG. 13 illustrates a schematic drawing for explaining a method of calculating the rate of change in intermediate curvature. In calculation of the rate of change in intermediate curvature at the movement point $P_n$ specified in advance, an intermediate curvature $\alpha_{n-1}$ of the movement point $P_n$ and an intermediate curvature $\alpha_{n-1}$ of the preceding movement point $P_{n-1}$ are acquired. Subsequently, a distance $l_n$ between the movement point $P_n$ and the movement point $P_{n-1}$ is calculated. The rate of change in curvature of the movement point $P_n$ can be calculated by equation (8) given below.

[Formula 5]

$$\beta_n = \frac{\alpha_n - \alpha_{n-1}}{l_n} \qquad (8)$$

$\beta_n$: rate of change in curvature of point $P_n$
$\alpha_n$: curvature of point $P_n$
$l_n$: distance between point $P_{n-1}$ and point $P_n$ Subsequently, the control device 70 performs a weight calculation step for calculating a weight of moving average based on rates of change in curvature of the first tool path at the respective movement points.

Referring to FIG. 7 and FIG. 8, in Step 46, the weight setting part 25 sets a weight for calculating a coordinate value of the moving average at each of the movement points. In the tool path generation method of the present embodiment, as in the second reference example, the positions of the movement points after correction are set by calculating the coordinate value of the moving average using the weights.

In an area of the tool path where the rate of change in curvature is large, the change in acceleration is considered to be large. Therefore, in the present embodiment, influence of smoothing is reduced at the movement points having a small rate of change in curvature. In other words, smoothing is weakened so as to increase the influence of the original movement points. In contrast, smoothing can be strengthened at the movement points having a large rate of change in curvature. In other words, smoothing can be strengthened so as to reduce the influence of the original movement points and increase the influence of the movement points in the periphery.

Figure 14:
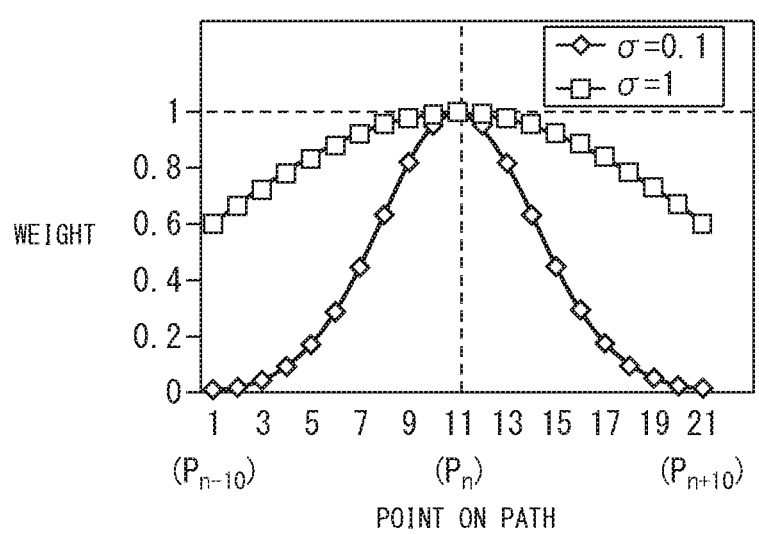
FIG. 14 is a graph of a weight used for calculating a moving average of the coordinate value when second tool path is generated.

FIG. 14 illustrates a graph of the weight for calculating the coordinate value of the moving average of the present embodiment. In the graph illustrated in FIG. 14, a graph having a standard deviation of 1, and a graph having a standard deviation of 0.1 are exemplified. In the present embodiment, the normal distribution is used for setting the weight used for calculation of the moving average. A lateral axis corresponds to the movement points on the tool path. A vertical axis corresponds to the weight $w_n$ for calculating the coordinate value of the moving average. In the present embodiment, the moving average value of 21 order is calculated and the coordinate values of the movement points after correction are calculated.

The weight of the movement point $P_n$ to be corrected increases as the standard deviation decreases, and the weight of the movement points decreases as it goes away from the movement point $P_n$. For example, it is understood that when the standard deviation is small, the difference between the weight $w_n$ at the movement points $P_n$ and the weight $w_{n-10}$ at the movement point $P_{n-10}$ is large. In other words, it is understood that the smaller the standard deviation is, the more the weight concentrates, and the larger the standard deviation is, the more the weight disperses.

Figure 15:
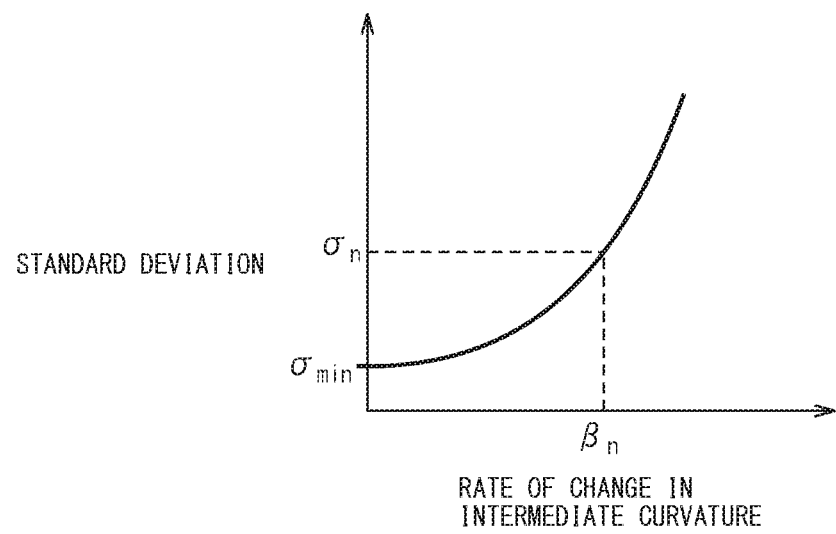
FIG. 15 is a graph of a standard deviation of a normal distribution relative to the rate of change in intermediate curvature.

FIG. 15 illustrates a graph indicating a relationship between the rate of change in intermediate curvature and the standard deviation of the normal distribution for setting the weight. In the present embodiment, the weight is dispersed at the movement points having a large rate of change in intermediate curvature. In other words, a normal distribution having a large standard deviation is employed. In contrast, a normal distribution having a small standard deviation is employed at the movement points having a small rate of change in intermediate curvature. In this manner, control is performed for increasing the standard deviation as the rate of change in intermediate curvature increases.

The standard deviation illustrated in FIG. 15 can be calculated based on the equation (9) given below. The standard deviation can be calculated based on the rate of change in intermediate curvature. A constant a and a minimum value $\sigma_{min}$ of the standard deviation in the equation (9) can be determined in advance by experiment or the like.

[Formula 6]

$$\sigma_n = \sigma_{min} + a\beta_n^2 \qquad (9)$$

$\sigma_n$: standard deviation of point $P_n$
$\sigma_{min}$: minimum value of standard deviation
a: constant
$\beta_n$: rate of change in curvature at point $P_n$ The weight setting part 25 is capable of setting the weight used when calculating the moving average value for each of the movement points based on the calculation formula of equation (9). Alternatively, a relationship between the rate of change in intermediate curvature and the standard deviation illustrated in FIG. 15 can be stored in a storage part in advance. The standard deviation of the normal distribution can be set based on the rate of change in intermediate curvature.

Referring to FIG. 7 and FIG. 8, next, in Step 47, the movement point correction part 26 calculates the coordinate values of the movement points after correction by using the set weight of moving average. The coordinate values after correction of the respective movement points can be calculated based on the above-described equation (5) and the equation (6). In other words, the movement points of the second tool path can be set. Subsequently, in Step 48, the program generation part 27 is capable of generating the second machining program 29 based on the calculated positions of the movement points after correction.

In this manner, in the present embodiment, a distribution of the weight is set for each of the movement points. The weight is set for each of the movement points, the coordinate value of the moving average is calculated, and the calculated coordinate is set to the movement points after correction.

In the example illustrated in FIG. 5, in the vicinity of the point A and the point B, the weight is set by using the graph having a large standard deviation. By adopting this control, a significant effect of smoothing is achieved in the vicinity of the point A and in the vicinity of the point B. In contrast, at the movement points having a small rate of change in intermediate curvature such as the point C, the point S, and the point E, the effect of smoothing can be reduced, for example, by setting the weight by using the graph having a small standard deviation.

FIG. 6 illustrates velocity and acceleration relating to the second tool path generated by the tool path generation method of the present embodiment in addition to the first tool path. In the present embodiment, in an area having a large rate of change in curvature, the weight is dispersed by employing a large standard deviation. An enhanced effect of smoothing is achieved by dispersion of the weight. When the effect of smoothing is enhanced, a change in curvature of the second tool path at the movement points after correction becomes gentle. Consequently, the rates of change in accelerations are reduced. Specifically, the changes in acceleration in the vicinity of the point A and in the vicinity of the point B are reduced with respect to the acceleration $a_x$ and the acceleration $a_y$ by employing the intermediate curvatures as a curvature of the first tool path.

Therefore, in the tool path generation method of the present embodiment, shaking and impact generated in the feed axis can be suppressed. Alternatively, deceleration to be performed before the direction of travel of the tool path changes can be suppressed. Movement at a higher velocity than that in the related art is achieved. For example, machining at a higher velocity than the tool path generated by the tool path generation method of the second reference example is achieved. Consequently, machining time can be reduced.

In the present embodiment, a normal distribution is used for setting the weight for calculating the coordinate value of the moving average. By adopting this method, the degree of dispersion of the weight can be changed by the standard deviation, so that the dispersion of the weight can be changed easily. In other words, the effect of smoothing can be adjusted easily. Referring to FIG. 14, when the influence of the coordinate of the movement point to be corrected is increased by concentrating the weight, the standard deviation is reduced. A difference between a maximum value and a minimum value of the weight is increased. In this case as well, a change in weight in the vicinity of the movement point to be corrected can be reduced. A change in weight in the vicinity of the movement point which is farthest from a prescribed movement point can be reduced. Therefore, a change in acceleration can be smoothed.

A distribution other than the normal distribution may be used for setting the weight for calculating the coordinate value of the moving average. For example, a distribution in which the weight is linearly changed as illustrated in FIG. 12 may be used.

Subsequently, features of the tool path generated by the tool path generation method of the present embodiment will be described.

Figure 16:
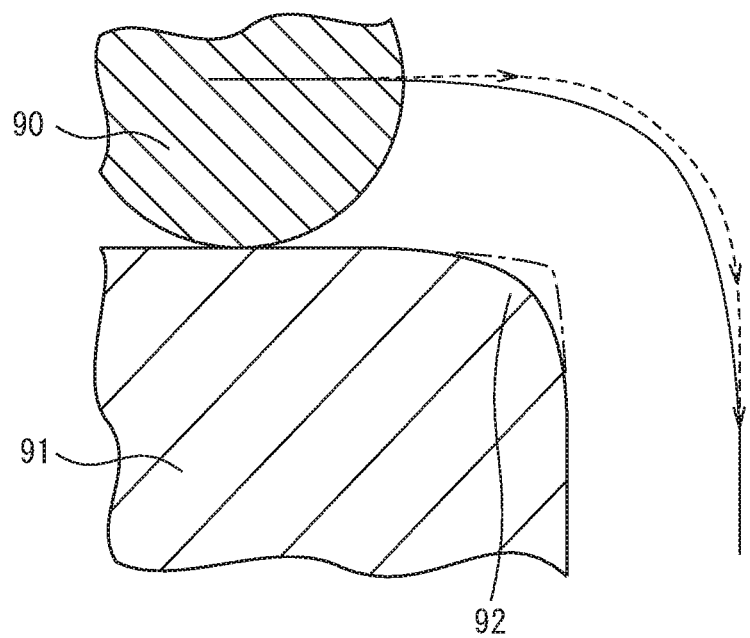
FIG. 16 is an explanatory drawing illustrating a shape of a workpiece and the tool path when being machined along the tool path of a reference example.

FIG. 16 illustrates a schematic drawing for explaining the tool path generated by the tool path generation method according to the second reference example. The first tool path and the second tool path generated by the tool path generation method of the second reference example are illustrated. In the tool path of the second reference example, the inboard turning phenomenon appears in the entire area of the curved part with respect to the input tool path. The workpiece 91 is resulted in a shape smaller than the desired shape at the curved part 92.

Figure 17:
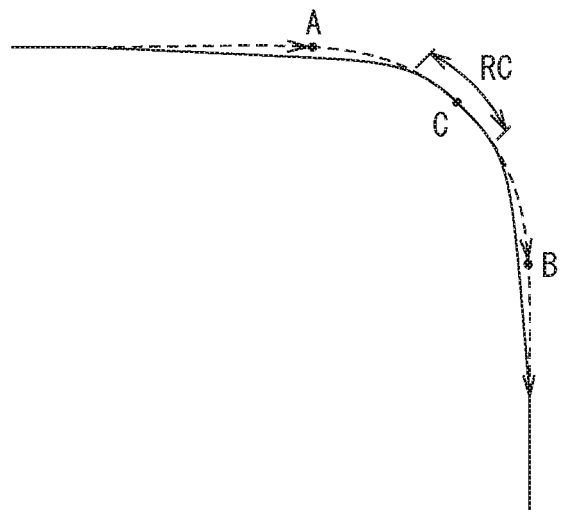
FIG. 17 is an explanatory drawing illustrating the second tool path generated by a tool path generation method according to first example.

FIG. 17 illustrates an explanatory drawing of a tool path generated by a tool path generation method according to first example. The first tool path to be input to the program correction apparatus and the second tool path generated by the tool path generation method of the present embodiment are illustrated. In the vicinity of the point A and in the vicinity of the point B where the change in acceleration is increased, the inboard turning phenomenon appears in the second tool path because the standard deviation is increased. In contrast, in an area RC in the vicinity of the point C, the influence of the coordinate value of the original movement point is increased because the standard deviation is reduced. In particular, in the area RC which corresponds to the top of the curved part 92 of the workpiece 91, the second tool path can be identical to the first tool path. In this manner, in the tool path generation method of the present embodiment, the tool path is proximate to the original tool path in the area where the rate of change in curvature is small, and the tool path apart from the original tool path is generated in the area in which the change in curvature is large.

Figure 18:
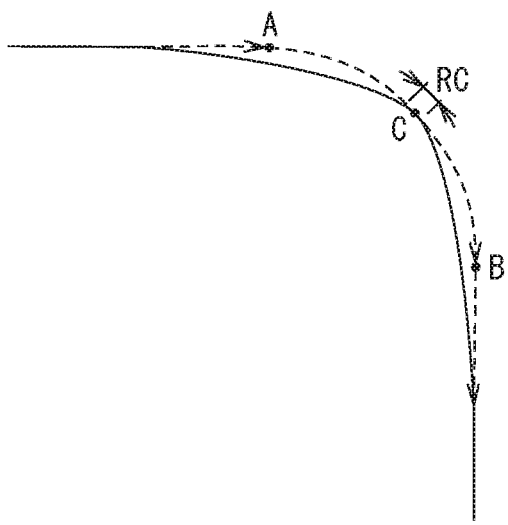
FIG. 18 is an explanatory drawing illustrating second tool path generated by a tool path generation method according to second example.

FIG. 18 illustrates an explanatory drawing of a tool path generated by a tool path generation method according to second example. In the tool path generation method of the second example, the second tool path overlaps with the first tool path in an area RC in the vicinity of the point C. However, the area RC of the second example is significantly smaller than the area RC of the first example. The curved part of the workpiece generated by the second tool path of the second example has a pointed shape compared with the curved part of the workpiece machined by the second tool path of the first example.

Referring to FIG. 17 and FIG. 18, the shape of such a curved part can be changed by changing the order used for calculating the moving average or pitches, which are intervals between the movement points. First description is made about a case where the pitches between the movement points are the same with each other.

When the order used for calculating the coordinate value of the moving average is increased, the coordinate value of the movement points disposed at larger distances may have an influence. Accordingly, an amount of inboard turning increases. In contrast, when the order is reduced, the coordinate values of the movement points disposed at larger distances may have less influence. Therefore, when the order is reduced, a tool path that has a large influence of the original movement point can be generated as the tool path of the first example. In contrast, the tool path of the second example having a small influence of the original movement point can be generated by increasing the order.

When the lengths of all pitches are changed with a constant order, the influence of the original coordinate values is increased by reducing the pitches, so that the tool path of the first example can be generated. In contrast, the influence of the coordinate values at large distances is enlarged by increasing the pitches, so that the tool path of the second example can be generated.

The tool path may be changed also by increasing or decreasing the standard deviation of the normal distribution for setting the weight for all the movement points. The tool path may be changed by changing the method of calculating the standard deviation for the intermediate rate of change. For example, the tool path may be changed by changing the shape of the graph in FIG. 15. The tool path of the first example may be generated by reducing the standard deviation for all the movement points. The tool path of the second example may be generated by increasing the standard deviation for all the movement points.

In addition, the pitches between the movement points may be set to be variable. For example, the first tool path may be configured to have longer pitches as the rate of change in curvature of the corresponding area becomes smaller. By increasing the pitches in the area having a small rate of change in curvature, the movement points at larger distances have an influence. Therefore, the tool path is changed before the rate of change in curvature increases so as to smooth the change in acceleration.

In the second tool path after correction, at least a part of the area is deviated from the first tool path. In other words, when the workpiece is machined, the shape of the workpiece may have a dimensional error. The dimensional error of the workpiece machined by the tool path of the second example is larger than those machined by the tool path of the first example. Therefore, the dimensional error of the machined workpiece can be adjusted by changing at least one of the order, the pitches, and the standard deviation used for calculating the moving average.

For example, when the order is increased, smoother curved surface is achieved. However, the amount of the inboard turning is increased. Therefore, the dimensional error from the designed value increases. An allowable value for the dimensional error of the machined workpieces is specified in advance. In the weight calculation step for calculating the weight of moving average, the number of movement points to be used for calculating the moving average can be set based on the allowable value for the dimensional error. For example, the maximum order with which the dimensional error falls within a range of allowable value can be selected.3

The standard deviation of the normal distribution for setting the weight can be set based on the allowable value for the dimensional error. For example, when the dimensional error exceeds the allowable value at the respective movement points, the standard deviation can be set such that the dimensional error falls within the allowable value.

Furthermore, in the step of setting the movement points, the pitches can be set based on the allowable value for the dimensional error. For example, the maximum pitch with which the dimensional error falls within a range of allowable value can be selected. When the pitches are varied, the distances between the respective movement points can be set based on the allowable value for the dimensional error.

By machining the workpiece such that the top of the bent part extends in a prescribed direction, a portion that appears to be linear, which portion is referred to as a character line, can be formed on the workpiece. The character line is part of a design of a product. It is also possible to form a portion corresponding to the character line on a mold for forming the character line on the product. In smoothing treatment in the tool path generation method of the reference example, the surfaces of the workpieces or molds are smoothed, while the character lines are blurred.

In the tool path generation method of the present embodiment, blurring of character lines can be suppressed. When the character line is formed, in particular, the second example illustrated in FIG. 18 is employed. With this control, the top portion of the curved part can be approximated to a pointed shape, so that the character line can be remained.

When the character line is formed, control for stopping smoothing treatment may be performed in the vicinity of the character line. However, when the smoothing treatment is stopped, the surface in the vicinity of the character line may not be smoothed. In contour processing, if there are paths in which the smoothing treatment is stopped, level differences may be generated between the tool paths adjacent to each other. In contrast, in the tool path generation method of the present embodiment, the character line can be formed as well as performing smoothing treatment. Alternatively, in contour processing, the character line can be formed while avoiding generation of the level differences.

The program correction apparatus 21 of the present embodiment may be provided on the CAM device or the machine tool. Subsequently, the machine tool provided with the program correction apparatus of the present embodiment will be described.

Figure 19:
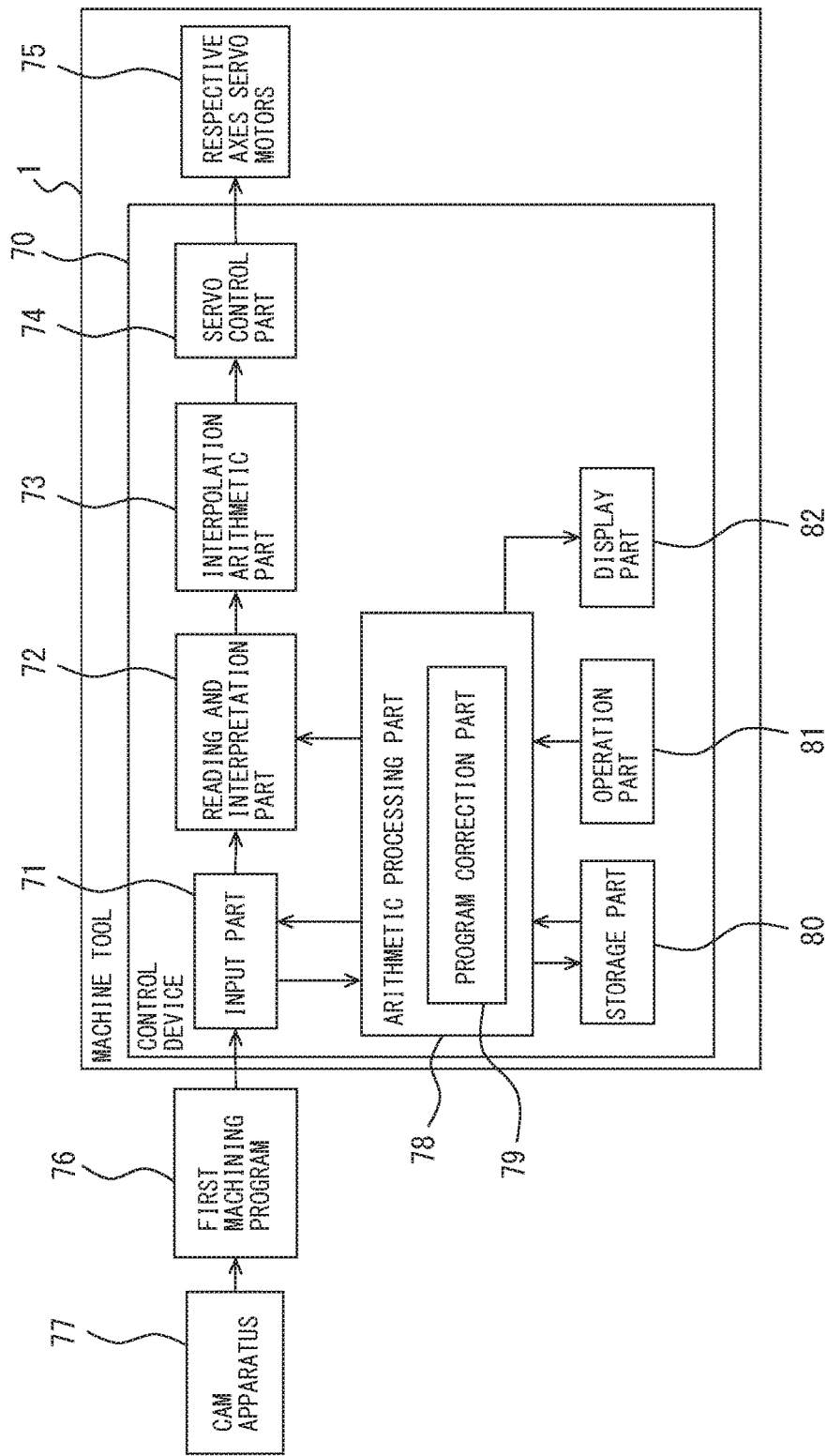
FIG. 19 is a block diagram illustrating a machine tool according to the embodiment.

FIG. 19 is a block diagram illustrating a machine tool according to the present embodiment. A machine tool 1 is provided with the control device 70. The control device 70 includes, for example, a CPU, a RAM, and a ROM connected to one another via buses. The control device 70 includes an input part 71, a reading and interpretation part 72, an interpolation arithmetic part 73, and a servo control part 74. When machining is performed with the machine tool 1, the first machining program 76 is prepared in advance. The first machining program 76 is capable of forming workpieces with the CAM apparatus 77 based on a target shape of the workpieces. The target shape of workpieces can be formed, for example, by a CAD (Computer Aided design) apparatus.

The first machining program 76 is input to the input part 71. The first machining program 76 includes information on relative movement of the tool with respect to the workpiece. Action commands for the machine tool are described by a command cord such as G code or M code in the first machining program 76. The first machining program may be formed newly by the operator by inputting characters via an operation part 81. The coordinate values of the movement points may be described in the first machining program.

The reading and interpretation part 72 reads a machining program from the input part 71. The reading and interpretation part 72 sends a movement command to the interpolation arithmetic part 73. The interpolation arithmetic part 73 calculates a position command value for each of interpolation cycles. For example, the interpolation arithmetic part 73 calculates an amount of movement for each time interval set on the basis of the movement command. The interpolation arithmetic part 73 sends the position command value to the servo control part 74. The servo control part 74 calculates the amount of movement of the respective feed axes such as the X-axis, the Y-axis, the Z-axis, and A-axis so as to drive respective axes servo motors 75 based on the position command values.

The control device 70 includes an arithmetic processing part 78 that controls machining information relating to machining of the workpieces. The arithmetic processing part 78 has functions of calculating and judging predetermined variables based on the machining information. The control device 70 includes the operation part 81 that allows the operator to input the machining information or the like and a display part 82 that displays the machining information. The operation part 81 includes a keyboard or the like, and allows the operator to input the machining information via a manual operation. The control device 70 includes a storage part 80 that stores the machining information. The storage part 80 may be a memory device such as a memory card or a hard disk connected via a communication interface in addition to the ROM or the RAM described above.

The arithmetic processing part 78 includes a program correction part 79. The program correction part 79 has a function of the above-described program correction apparatus 21. In other words, the program correction part 79 acquires the first machining program 76 from the input part 71. The program correction part 79 generates the second tool path by performing the smoothing treatment of the present embodiment with respect to the first tool path. The program correction part 79 generates the second machining program based on the second tool path. The program correction part 79 sends the second machining program to the input part 71. The machine tool 1 drives the respective axes servo motors 75 based on the second program.

In this manner, in the machine tool, machining can be performed by correcting the tool path by the tool path generation method of the present embodiment.

The example in which machining is performed while the workpiece stops and the tool moves has been described in the present embodiment. However, the mode is not limited thereto, and the present invention may be applied to the tool path generation method and the machine tool in which at least one of the workpiece and the tool moves.

The embodiments described above may be combined as needed. In the respective controls described above, the order of steps may be changed within a range in which the function and effects are not changed.

In the respective drawings, the same or equivalent portions are denoted by the same reference numerals. The above-described embodiments are exemplary, and are not intended to limit the invention. In the embodiments, modifications of the embodiments described in claims are included.

REFERENCE SIGNS LIST

1 Machine tool
21 Program correction apparatus
22 Movement point setting part
23 Intermediate curvature calculation part
24 Rate-of-change calculation part
25 Weight setting part
26 Movement point correction part
27 Program generation part
29 Second machining program
70 Control device
72 Reading and interpretation part
75 Respective axes servo motor
76 First machining program
79 Program correction part
90 Tool
91 Workpiece

The invention claimed is:

1. A method of machining a workpiece with a machine tool using a second tool path generated by performing smoothing treatment with respect to a first tool path for machining the workpiece with the machine tool, the method comprising:
generating the first tool path in which movement points, each associated with a coordinate value, are connected by straight lines;
a step of identifying the movement points in the first tool path;
a rate-of-change calculation step for calculating a rate of change in curvature of the first tool path at each of the movement points;
a weight calculation step for calculating a weight of a moving average at each of the movement points based on the rate of change in the curvature of the first tool path at each of the movement points;
the moving average being based on the respective movement point and a number of adjacent movement points on the first tool path and the weight, and the weight comprising a weight distribution that is adjusted so that smoothing increases as the corresponding rate of change of curvature increases;
a step of calculating a coordinate value of the moving average of each of the movement points by using the weight at each of the movement points and coordinate values of the movement point and the number of adjacent movement points;
setting the coordinate value of the moving average of each movement point as a coordinate value of a corresponding movement point of the second tool path; and
machining the workpiece along the second tool path.

2. The method according to claim 1, wherein the rate-of-change calculation step includes a step of calculating a moving average value in the curvature at each of the movement points of the first tool path, and
a step of calculating the rate of change in the curvature based on the calculated moving average value in the curvature.

3. The method according to claim 1, wherein the weight calculation step includes
a step of calculating a standard deviation of a normal distribution based on the rate of change in the curvature, and
a step of calculating the weight of the moving average based on the normal distribution including the calculated standard deviation.

4. The method according to claim 1, wherein
an allowable value of a dimensional error of a machined workpiece is determined in advance, and
the weight calculation step includes a step of setting the number of movement points to be used for calculation of the moving average based on the allowable value.

5. A machine tool comprising a control device that generates a second tool path by performing smoothing treatment on a first tool path set by a first machining program, in the first tool path movement points, each associated with a coordinate value, being connected by straight lines,
wherein the control device includes:
a movement point setting part that identifies the movement points based on the first tool path;
a rate-of-change calculation part that calculates a rate of change in curvature of the first tool path at each of the movement points;
a weight setting part that calculates a weight of a moving average at each of the movement points based on the rate of change in the curvature of the first tool path at each of the movement points;
the moving average being based on the respective movement point and a number of adjacent movement points on the first tool path and the weight, and the weight comprising a weight distribution that is adjusted so that smoothing increases as the corresponding rate of change of curvature increases;
a movement point correction part that calculates a coordinate value of the moving average of each of the movement points by using the weight at each of the movement points and coordinate values of the movement point and the number of adjacent movement points, and sets the coordinate value of the moving average of each of the movement points as a coordinate value of a corresponding movement point of the second tool path; and
a program generation part that generates a second machining program based on the coordinate values of the movement points of the second tool path; and
wherein the machine tool is configured to machine the workpiece based on the second machining program.

* * * * *